United States Patent [19]
Zarabadi et al.

[11] Patent Number: 5,872,313
[45] Date of Patent: Feb. 16, 1999

[54] TEMPERATURE-COMPENSATED SURFACE MICROMACHINED ANGULAR RATE SENSOR

[75] Inventors: Seyed Ramezan Zarabadi, Kokomo; Jack Daniel Johnson, Rossville, both of Ind.; Michael William Putty, Eastpointe, Mich.

[73] Assignee: Delco Electronics Corporation, Kokomo, Ind.

[21] Appl. No.: 833,438

[22] Filed: Apr. 7, 1997

[51] Int. Cl.$^6$ ........................................................ G01P 3/00
[52] U.S. Cl. ........................................... 73/497; 73/504.12
[58] Field of Search ................................. 73/497, DIG. 1, 73/514.32, 504.12, 504.13, 862.041, 862.626, 1.37, 1.82; 361/283.4

[56] References Cited

U.S. PATENT DOCUMENTS

| | | | |
|---|---|---|---|
| 5,226,321 | 7/1993 | Varnham et al. | 73/505 |
| 5,450,751 | 9/1995 | Putty et al. | 73/504.18 |
| 5,547,093 | 8/1996 | Sparks | 216/2 |
| 5,623,098 | 4/1997 | Castleman | 73/497 |
| 5,652,374 | 7/1997 | Chia | 73/504.12 |

OTHER PUBLICATIONS

K. Funk et al., Surface–Micromachining of Resonant Silicon Structures, Transducers '–Eurosensors IX, 8th Int'l Conf. on Solid–State Sensors and Actuators, and Eurosensors IX, Stockholm, Sweden, Jun. 25–29, 1995, pp. 50–52.

*Primary Examiner*—Chrisitine K. Oda
*Attorney, Agent, or Firm*—Jimmy L. Funke

[57] ABSTRACT

A motion sensor having a micromachine sensing element and electrodes formed on a silicon chip. The sensing element includes a ring supported above a substrate so as to have an axis of rotation normal to the substrate. Surrounding the ring is at least one pair of diametrically-opposed electrode structures. The sensing ring and electrode structures are configured to include interdigitized members whose relative placement to each other enables at least partial cancellation of the effect of differential thermal expansion of the ring and electrodes. As a result, the performance of the motion sensor is, to first order, insensitive to temperature variation. The sensor further includes circuitry for creating and detecting an electrostatic force between the interdigitized members of the sensing ring and electrode structures. The circuitry operates to sum the electrostatic forces such that, on the occurrence of a temperature change, a corresponding decrease in the electrostatic force between one pair of interdigitized members will at least partially cancel a corresponding increase in electrostatic force between a second pair of interdigitized members. Accordingly, the net effect is that a temperature change will have a reduced effect on the sensing performance of the sensor, because the effects of thermal expansion will be at least partially canceled.

20 Claims, 3 Drawing Sheets

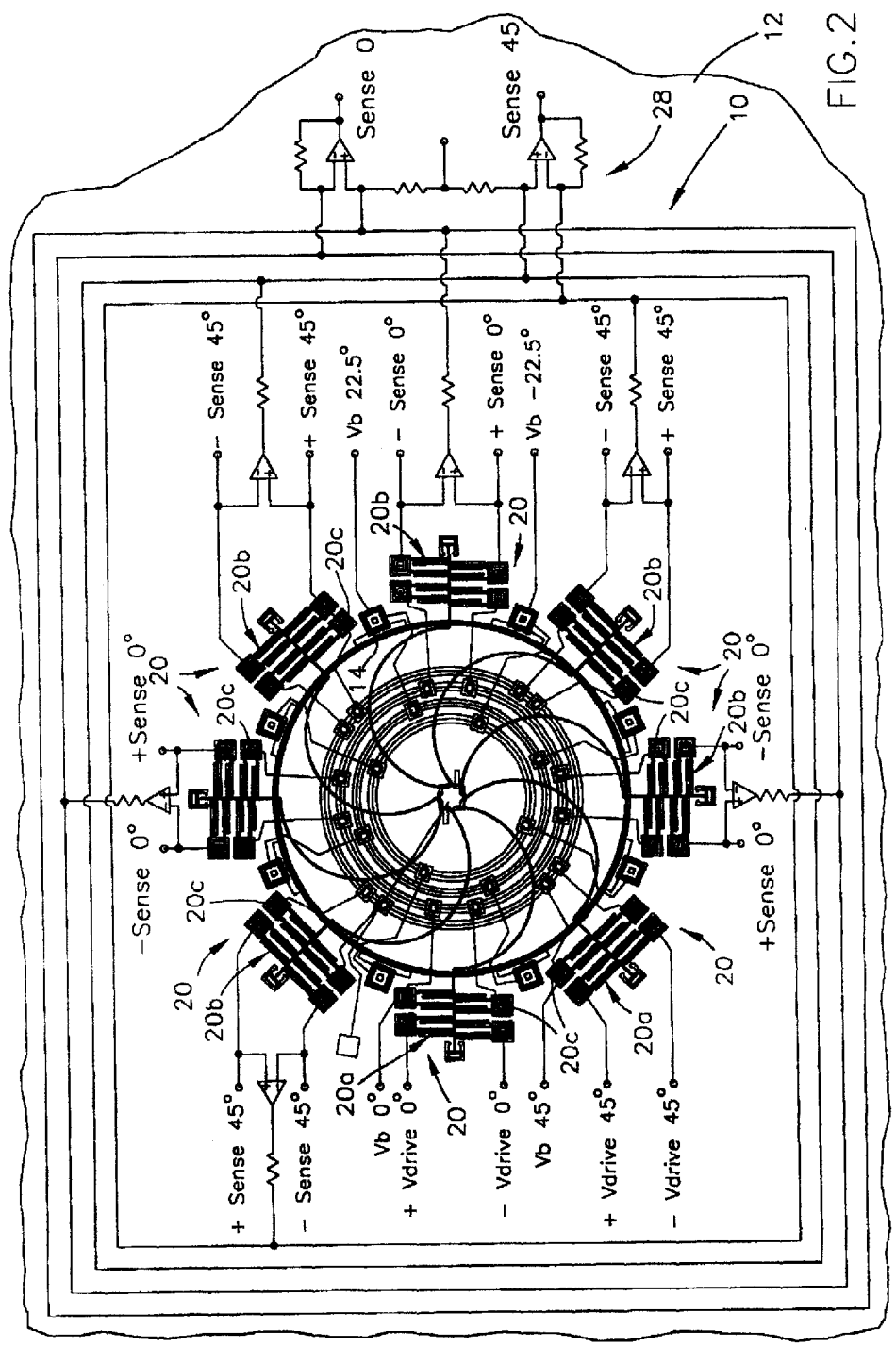

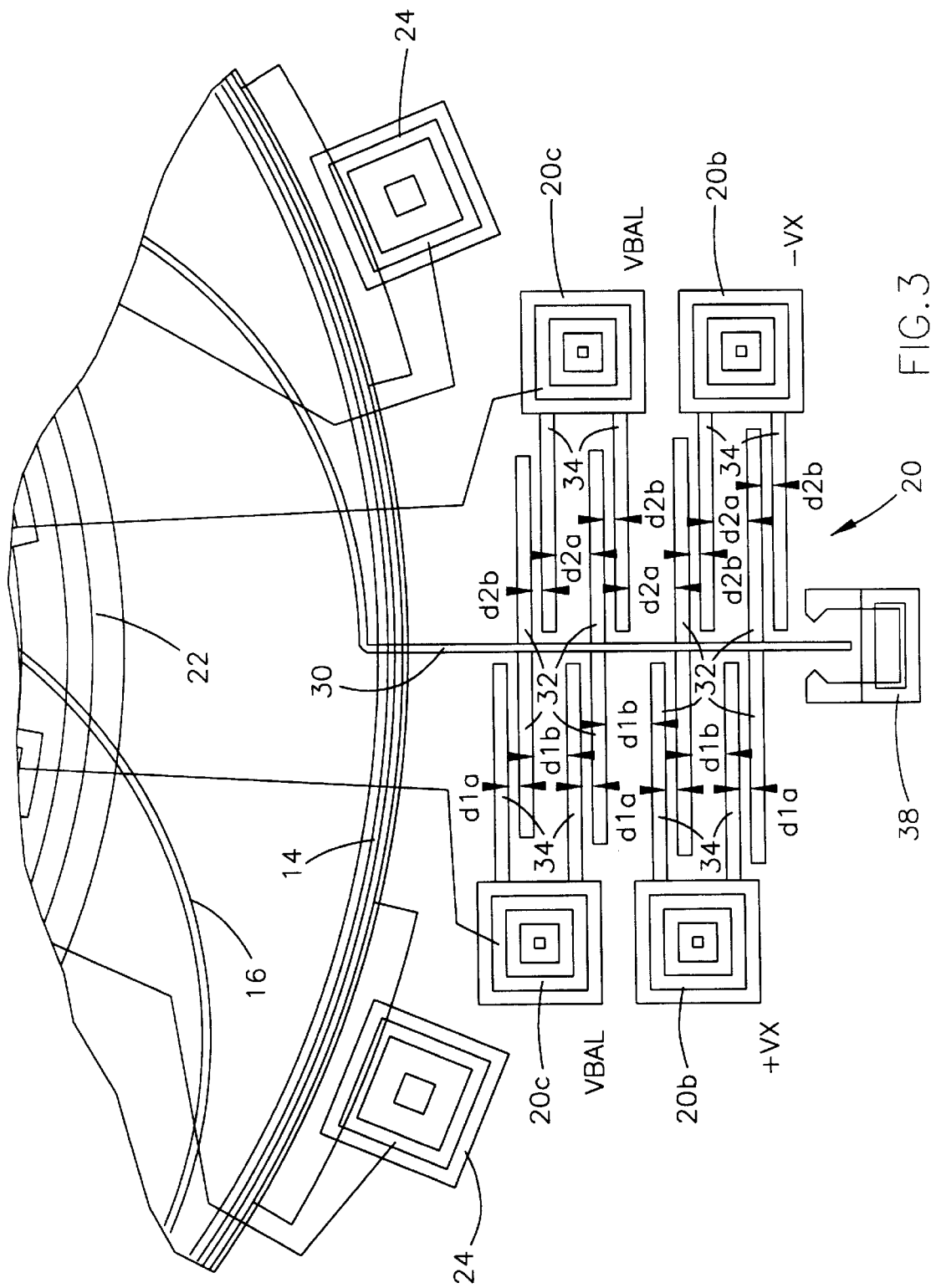

TEMPERATURE-COMPENSATED SURFACE MICROMACHINED ANGULAR RATE SENSOR

FIELD OF THE INVENTION

The present invention generally relates to micromachine semiconductor/conductor sensing devices. More particularly, this invention relates to an angular rate sensor configured to exhibit minimum sensitivity to temperature variation.

BACKGROUND OF THE INVENTION

Motion sensors, which include gyroscopes and their components (e.g., angular rate sensors and accelerometers), are widely used in VCR cameras and aerospace and automotive safety control systems and navigational systems. Examples of automotive applications include anti-lock braking systems, active suspension systems, supplemental inflatable restraint (SIR) systems such as air bags and seat belt lock-up systems, and crash sensing systems. Automotive yaw rate sensors sense rotation of an automobile about its vertical axis, while accelerometers are used to sense acceleration and deceleration of an automobile.

In the past, electromechanical and electronic motion sensors have been widely used in the automotive industry to detect an automobile's deceleration. More recently, sensors that employ an electrically-conductive, micromachined plated metal or silicon sensing element have been developed which can be integrated with bipolar/CMOS/BiCMOS circuits on a wafer. An example of a plated metal surface micromachine is disclosed in U.S. Pat. No. 5,450,751 to Putty et al. assigned to the assignee of this invention. The disclosed micromachine is formed by a metal plating technique in cooperation with a mold that defines the shape of the micromachine on the surface of a wafer. Putty et al. further disclose a novel configuration for the micromachine, which includes a resonating metal ring and spring system. A variation of the sensor disclosed by Putty et al. is described in U.S. Pat. No. 5,547,093 to Sparks, in which an electrically-conductive, micromachined silicon sensing element is disclosed. Sparks micromachined sensing element is formed by etching a "sensing" chip formed of a single-crystal silicon wafer or a polysilicon film on a silicon or glass handle wafer.

The sensors of both Putty et al. and Sparks employ an electrode pattern composed of a number of individual electrodes along the perimeter of the ring. A capping wafer can be used to enclose the ring within an evacuated cavity defined by and between the sensing and capping wafers. Conductive runners on the sensing chip enable the electrodes to be electrically interconnected with appropriate signal conditioning circuitry and to provide a biasing voltage to the ring. In operation, some of the electrodes serve as "drive" electrodes that drive the ring to resonate when the electrodes are appropriately energized. Other electrodes serve as "balance" electrodes that when energized serve to balance the resonant peaks of the flexural movement of the ring by changing the electromechanical stiffness of the ring and springs. Still other electrodes are "sensing" electrodes that capacitively sense the proximity of the ring relative to the sensing electrodes. With the above construction, a sensor is able to detect movement of the ring toward and away from the sensing electrodes, which occurs in response to the angular velocity of the ring about its axis of rotation due to the effects of the Coriolis force. Consequently, when properly installed, the sensor is able to sense rotation rate about any chosen axis of an automobile.

Sensors of the type described above are capable of extremely precise measurements, and are therefore desirable for use in automotive applications. However, the intricate sensing element required for such sensors must be precisely formed in order to ensure the proper operation of the sensor. For example, a sufficient gap must exist between the electrodes and the sensing element ring to prevent shorting, yet sufficiently close to maximize the capacitive output signal of the sensor. In addition to these operational considerations, there is a continuing emphasis for motion sensors that are lower in cost, yet exhibit high reliability and performance capability. The cost of a sensor is strongly impacted by its process yield, which in turn is a function of the parameter sensitivities of the sensor with temperature. Temperature sensitivities are present due to the narrow gap required between the ring and its drive, balance and sensing electrodes, the effect of which is compounded by the large length ratios between the ring and electrodes. The natural mode frequency of the ring is also affected by temperature, which can impact the scale factor response of the ring at resonance.

Therefore, it would be highly desirable if further advancements could be made toward reducing the sensitivity of the above-described motion sensors to temperature variations in their operating environment.

SUMMARY OF THE INVENTION

It is an object of this invention to provide a motion sensor that exhibits reduced sensitivity to temperature variation.

It is another object of this invention that such a motion sensor is configured as an angular rate sensor having a sensing element with an axis of rotation, and electrodes disposed along its perimeter for sensing movement of the ring in response to rotary motion.

It is yet another object of this invention that such a motion sensor incorporates a novel electrode structure configured to drive, balance and/or sense the ring, and by which the effects of thermal expansion differentials are at least partially canceled.

It is still another object that the electrode structure entails members that are interdigitized with complementary members of the ring.

In accordance with a preferred embodiment of this invention, these and other objects and advantages are accomplished as follows.

According to the present invention, there is provided a motion sensor having a micromachine sensing element and electrodes formed on or in a surface region of a silicon chip. The sensing element and electrodes are configured to include interdigitized members whose relative placement to each other enable at least partial cancellation of the effect of differential thermal expansion of the ring and electrodes. As a result, the performance of the motion sensor is, to first order, insensitive to temperature variation.

The sensor of this invention generally includes a sensing ring supported above a substrate so as to have an axis of rotation normal to the substrate. Surrounding the ring is at least one pair of diametrically-opposed electrode structures. According to this invention, each electrode structure includes a base member that extends radially from the ring, with at least two members extending perpendicularly from the base member. In addition, the electrode structure includes electrodes adjacent the members of the base member. A first of the electrodes is spaced apart from the first member of the base member such that the distance "$d_1$" between the first electrode and member increases with a given change in temperature (ΔT) of the sensing ring due to thermal expansion. A second of the electrodes is adjacent the second member of the base member such that the distance "$d_2$" between the second electrode and member decreases with the same change in temperature. (Correspondingly, the distances $d_1$ and $d_2$ will decrease and increase, respectively, if an opposite change in temperature occurs, e.g., an increase instead of decrease in temperature).

Finally, the sensor includes circuitry for detecting a first electrostatic force between the first electrode and member and a second electrostatic force between the second electrode and member of at least one of the electrode structures. The circuitry operates to sum the electrostatic forces such that, on the occurrence of the above-referenced temperature change, a corresponding decrease in the electrostatic force across the distance $d_1$ will at least partially cancel a corresponding increase in the electrostatic force across the distance $d_2$. The net effect is that the temperature change will have a reduced effect on the sensing performance of the sensor, because the effects of thermal expansion will be at least partially canceled. According to this invention, improved cancellation of a temperature change effect can be achieved by configuring each electrode structure to include multiple electrode structures located equi-angularly around the sensing ring, with each electrode structure having multiple interdigitized electrodes and members. Further performance enhancements can be achieved by appropriately spacing the electrodes from their respective adjacent members and from other nearby members, with the result that a nearly complete cancellation of a temperature change effect can be achieved.

Full realization of the benefits of this invention with sensors of the type disclosed by Putty et al. and Sparks would entail configuring the sensor to include drive, balance and sensing electrodes, with each electrode having the electrode structure described above. As a result, the undesirable effect of temperature variations would have a reduced effect on maintaining the ring at resonance, balancing the resonant peaks of the ring's rotary movement by inducing stiffness, and capacitively sensing the proximity of the ring, whose movement relative to the sensing electrode is in response to flexural movement of the ring due to the effects of the Coriolis force.

Other objects and advantages of this invention will be better appreciated from the following detailed description.

BRIEF DESCRIPTION OF THE DRAWING

The above and other advantages of this invention will become more apparent from the following description taken in conjunction with the accompanying drawings, in which:

FIG. 2 is a schematic of suitable circuitry for the sensing chip of FIG. 1; and

FIG. 3 is a more detailed view of an electrode structure of the sensing chip of FIG. 1.

DETAILED DESCRIPTION OF THE INVENTION

Figure 1:
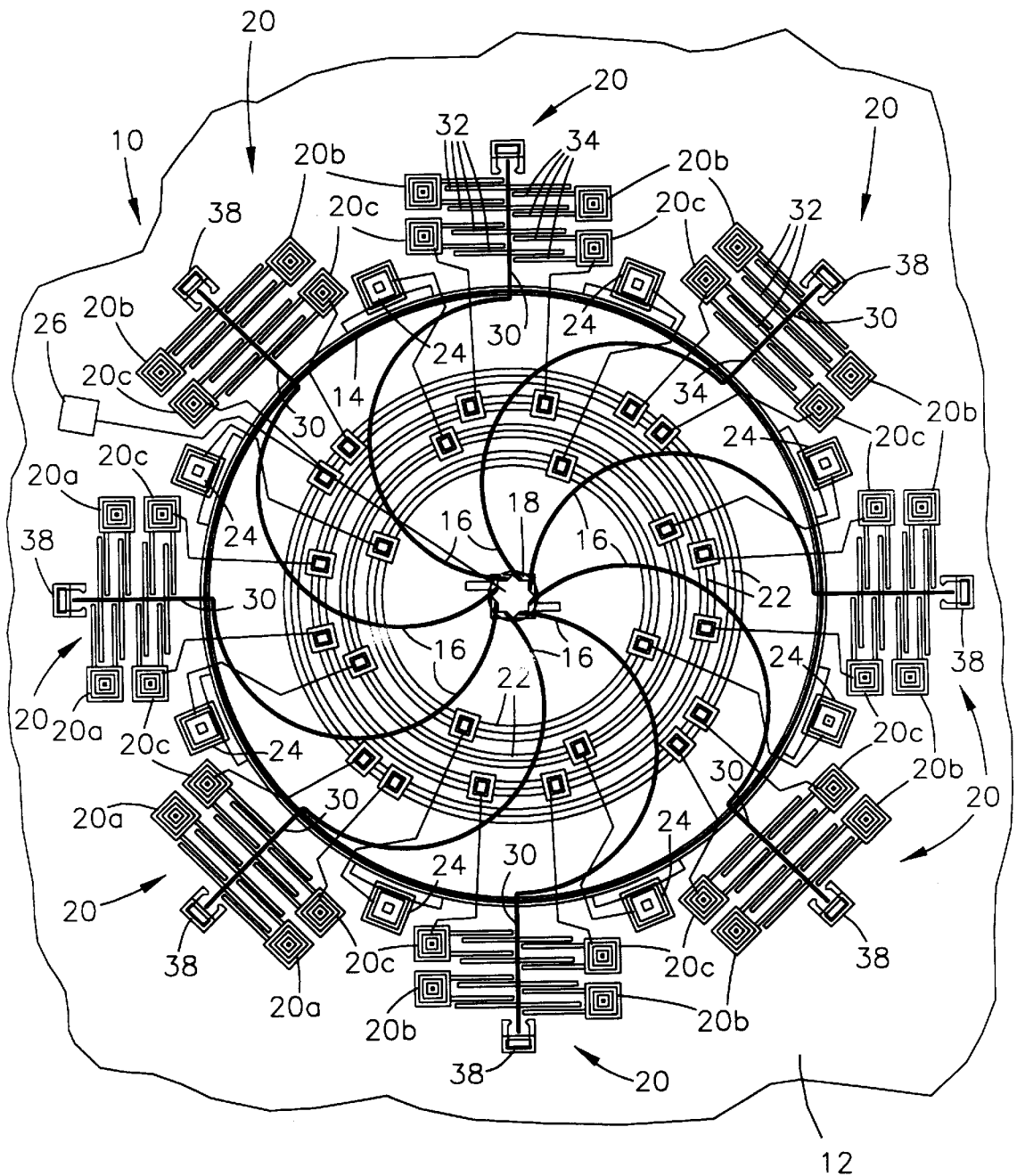
FIG. 1 shows a plan view of an angular rate motion sensing chip in accordance with a preferred embodiment of this invention.

FIGS. 1 through 3 represent a motion sensor 10 in accordance with the present invention. While the sensor 10 will be described particularly as being an angular rate motion sensor, those skilled in the art will appreciate that the sensor 10 could also operate as an acceleration sensor. As illustrated, the sensor 10 includes a sensing element formed on a sensing wafer 12. The sensing element includes a ring 14 that is supported by a number of arcuate springs 16 radially extending from a center hub or post 18. The ring 14, springs 16 and post 18 may be an all-silicon monolithic structure in accordance with Sparks, which is incorporated herein by reference, or a plated metal surface micromachine in accordance with Putty et al., which is also incorporated herein by reference.

As shown in FIG. 1, the ring 14 is surrounded by a number of electrode structures 20 formed on the wafer 12. As shown, the electrode structures 20 form an equi-angularly spaced electrode pattern in close proximity to the perimeter of the ring 14. The ring 14 and the electrodes 20 are formed to be electrically conductive, as will be explained below, enabling special features of the ring 14 to form a capacitor with complementary features of the electrode structures 20 when a voltage potential is present. As indicated in FIG. 2, some of the electrode structures 20 are configured to include drive electrodes 20a that drive the ring 14 into resonance when energized, while other electrode structures 20 are configured as sensing electrodes 20b to capacitively sense the proximity of the ring 14, which will vary due to Coriolis forces that occur when the ring 14 is subjected to rotary motion.

As shown in the Figures, each of the electrode structures 20 are also configured to include balance electrodes 20c that, when energized, balance the resonant peaks of the rotary movement of the ring 14 by inducing stiffness in the ring 14 and springs 16. The balance electrodes 20c are shown as being radially inward from the drive and sensing electrodes 20a and 20b, and are electrically interconnected to concentric conductors 22 located beneath the ring 14 on the wafer 12. Also shown are additional balance electrodes 24 disposed equi-angularly around the perimeter of the ring 14, which serve to fine balance the sensing structure. For this purpose, these electrodes 24 are capacitively coupled to the ring 14 and electrically interconnected with some of the concentric conductors 22, as shown. The ring 14, springs 16 and post 18 are electrically insulated from the wafer 12, and electrically interconnected to a conductor 26 outside the ring 14 so as to allow an appropriate electrical potential to be established between the sensing structure and the electrodes 20a, 20b, 20c and 24.

With the above construction, the sensor 10 is able to detect angular velocity about the vertical axis of the ring 14 and, therefore, rotary movement about an axis of a body, such as an automobile, to which the sensor 10 is mounted. Shown in FIG. 2 is conditioning circuitry 28 formed on the wafer 12 and electrically interconnected with the sensing electrodes 20b. Importantly, differential driving and sensing techniques are employed by the present invention, as is evident from the circuitry 28 shown in FIG. 2. The operational requirements of the circuitry 28 will be appreciated by those skilled in the art, and therefore will not be discussed in any detail here. It is sufficient to say that the performance of the sensor 10 is optimized by equi-angularly placing the electrode structures 20 around the perimeter of the ring 14, and that symmetry of the sensor 10 is essential for its proper operation, as will be understood by those skilled in the art. In addition, at least two drive electrodes 20a are required, these electrodes 20a not being diametrically-opposite each other, but preferably offset from each other by about 45 degrees as shown. However, other configurations are foreseeable, depending on the intended application and operating natural mode of the device. Finally, the performance of the sensor 10 is generally enhanced by increasing the number of sensing electrodes 20b present.

The electrode structures 20 of this invention will be better understood with the following detailed description, with particular reference to FIG. 3. As shown, each electrode structure 20 includes a base 30 that extends radially from the ring 14, with multiple pairs of opposing teeth 32 extending perpendicularly from the base 30. Because the base 30 and teeth 32 are physically connected to the ring 14, and preferably formed integrally with the ring 14, the base 30 and teeth 32 will be subjected to the same rotary movement as the ring 14. A stop 38 is shown in the Figures for limiting the lateral movement of the base 30, and therefore prevents the teeth 32 from contacting the surrounding electrode structure 20 due to excessive angular and/or linear acceleration of the ring 14. Importantly, the base 30 and teeth 32 will also be subject to thermal expansion and contraction with the ring 14 when subjected to variations in temperature. For example, with an increase in temperature, the base 30 and teeth 32 will move radially outward with the ring 14.

As also shown, each electrode structure 20 includes an arrangement of electrodes 34 that are interdigitized with the teeth 32. The electrodes 34 are not subjected to the same thermal expansion and contraction of the ring 14 as a result of being formed in the surface of the wafer 12, and therefore subjected to the thermal expansion and contraction of the wafer 12. Differences in thermal expansion and contraction between the ring 14, base 30 and teeth 32 and the remaining electrode structure 20 occur due to the large length ratios therebetween. Because the electrostatic forces between the teeth 32 and electrodes 34 are dependent on the distance therebetween, and these same forces govern the performance of the drive, sensing and balance electrodes 20a–c, the effect of differential expansion and contraction of the ring 14 and electrode structures 20 is detrimental to the performance of the sensor 10.

According to this invention, differential expansion and contraction of the sensor structure is compensated in the manner by which the teeth 32 and electrodes 34 interface with each other. As seen in FIG. 3, the outermost electrodes (shown here as a sensing electrode 20b) are connected differentially, as $+V_X$ and $-V_X$. The electrostatic force between any given tooth 32 and its immediately adjacent electrode 34 is given by the equation:

$$F = \frac{V^2}{2} \frac{\partial C}{\partial d} \approx \frac{\epsilon A V^2}{2d^2}$$

where V is the voltage between the tooth 32 and its adjacent electrode 34, A is the area of the electrode 20 facing the tooth 32, G is the permittivity of the gap material, and d is the gap width. From this equation, it is apparent that the electrostatic force "F" is inversely proportional to the square of the gap width "d".

With further reference to FIG. 3, the voltage $+V_X$ applied to the electrode 20b can be seen to exert a motional force $F_1$ on the two of the teeth 32 proportional to the gap widths $d_{1a}$ and $d_{1b}$ as follows:

$$F_1 = [F_{1a} - F_{1b}] \propto [1/d_{1a}^2 - 1/d_{1b}^2]$$

where $d_{1a}$ is the lesser distance and $d_{1b}$ is the greater distance between the teeth 32 and the electrodes 34 subjected to the voltage $+V_X$ at the electrode 20b. Similarly, the voltage $-V_X$ applied to the opposite side of the electrode 20b exerts a motional force on two teeth 32 proportional to the gap widths $d_{2a}$ and $d_{2b}$ as follows:

$$F_2 = [F_{2b} - F_{2a}] \propto [1/d_{2b}^2 - 1/d_{2a}^2]$$

where $d_{2b}$ is the lesser distance and $d_{2a}$ is the greater distance between the teeth 32 and the electrodes 34 subjected to the voltage $-V_X$. Therefore, the total electrostatic force on the teeth 32, and therefore the ring 14 adjacent the electrode 20b, is proportional to the sum of these forces as follows:

$$F_T \propto [1/d_{1a}^2 - 1/d_{1b}^2 + 1/d_{2b}^2 - 1/d_{2a}^2]$$

As the ring 14 expands in response to a temperature increase, the gap widths $d_{1a}$ and $d_{2a}$ will increase while the gap widths $d_{1b}$ and $d_{2b}$ will decrease a corresponding amount. Accordingly, first order temperature compensation occurs with respect to the total electrostatic force between the electrodes 34 and the teeth 32, in that the increase in electrostatic force occurring across the gap widths $d_{1b}$ and $d_{2b}$ will be offset by a decrease in electrostatic force occurring across the gap widths $d_{1a}$ and $d_{2a}$.

Consequently, through appropriate design of these gap widths between the teeth 32 and electrodes 34, in combination with the differential sensing with the circuitry 18 shown in FIG. 2, the sensitivity of the sensor 10 relative to gap width variation with temperature is reduced and can be nearly eliminated. In particular, and as shown in FIG. 3, the performance of the sensor 10 is promoted if the distance $d_{1a}$ is approximately equal to the distance $d_{2b}$, the distance $d_{1b}$ is approximately equal to the distance $d_{2a}$, and the distances $d_{1a}$ and $d_{2b}$ are less than the distances $d_{1b}$ and $d_{2a}$. When proportioned appropriately, on occurrence of a temperature change, the corresponding decrease in the electrostatic force $F_{1a}$ across the distance $d_{1a}$ will approximately cancel the corresponding increase in the electrostatic force $F_{2b}$ across the distance $d_{2b}$, and the corresponding increase in the electrostatic force $F_{1b}$ across the distance $d_{1b}$ will approximately cancel the corresponding decrease in the electrostatic force $F_{2a}$ across the distance $d_{2a}$.

Importantly, with respect to the drive and balance electrodes 20a and 20c, gap width variations with temperature would also adversely affect the resonant frequency and the ability to balance the sensor 10, because a change in the gap width changes the electrostatic force used by the drive electrodes 20a to drive the ring 14, and changes the electrostatic force used by the balancing electrodes 20c to induce stiffness in the ring 14. Specifically, the spring constant of the ring 14 changes with gap width variation as follows:

$$K \approx \frac{\epsilon A V^2}{2d^2 (d_0 - d)}$$

where K is the lumped mechanical spring constant of the ring 14, $d_0$ is the initial gap width when the electric potential between the ring 14 and electrode 20a/20c is zero, and d is the gap width when an electric potential is applied between the ring 14 and electrode 20a/20c. With the electrode structure 20 shown in the Figures, the electrostatic force between the teeth 32 and electrodes 34, and therefore the ring 14 and drive and electrodes 20a and 20c, will be constant to the first order. Accordingly, the resonant/normal mode frequencies of the ring 14 will exhibit minimal sensitivity to temperature variation. Based on the configuration shown for the drive and balancing electrodes 20a and 20c, the effective spring constant of the ring 14 can be written as:

$$K_{eff} \approx \frac{\epsilon A V^2}{2(d + \Delta d)^2 (d_0 - d - \Delta d)} - \frac{\epsilon A V^2}{2(d - \Delta d)^2 (d_0 - d + \Delta d)}$$

where $\Delta d$ is the change in the gap width with temperature. The above expression evidences that any change in the value of the first term due to Δd is compensated by a change in value of the second term due to Δd.

From the above, it can be seen that the electrode structure 20 of this invention is capable of significantly enhancing the performance of a motion sensor by decreasing the influence of temperature variation on the driving, sensing and balancing characteristics of the sensor. In the case of sensing or driving the ring 14, differential sense or drive connections at the drive and sensing electrodes 20a and 20b, as shown in FIG. 2, are employed to assure proper operation of the sensor 10. In contrast, a balance voltage $V_{BAL}$ can be connected to both sides of the balance electrodes 20c, as shown in FIGS. 2 and 3. In combination, the unique electrode structures 20 of this invention and the differential sensing and driving technique for the drive and sensing electrodes 20a and 20b, reduce to first order the temperature sensitivity of the drive, sensing and balancing electrodes 20a–20c. As a result, higher yields for the sensor 10 are promoted, permitting a lower cost and more reliable sensing system.

While conventional silicon processing materials and techniques can be employed to form the sensor 10 of this invention, including all of the structural features of the electrode structures 20, other materials and processing techniques can be used. In addition, while a particular configuration is shown for the ring 14, springs 16, and electrode structures 20, various modifications could be made by one skilled in the art. Finally, it is foreseeable that the present invention can be utilized to encompass a multitude of applications through the addition or substitution of other processing or sensing technologies.

Therefore, while the invention has been described in terms of a preferred embodiment, other forms could be adopted by one skilled in the art. Accordingly, the scope of the invention is to be limited only by the following claims.

What is claimed is:

1. A motion sensor comprising:
    a substrate;
    a sensing ring supported above the substrate so as to have an axis of rotation normal to the substrate;
    at least one pair of diametrically-opposed electrode structures around the sensing ring, each electrode structure comprising:
        a base member extending radially from the sensing ring;
        first and second members extending perpendicularly from the base member;
        a first electrode adjacent the first member such that the first electrode is a distance "$d_1$" from the first member, the distance $d_1$ increasing with a change "ΔT" in temperature of the sensing ring due to thermal expansion thereof; and
        a second electrode adjacent the second member such that the second electrode is a distance "$d_2$" from the second member, the distance $d_2$ decreasing with the change ΔT in temperature of the sensing ring due to thermal expansion thereof; and
    circuitry for detecting an electrostatic force "$F_1$" between the first electrode and the first member and an electrostatic force "$F_2$" between the second electrode and the second member of at least one electrode structure of the at least one pair of diametrically-opposed electrode structures, the circuitry further summing the electrostatic forces $F_1$ and $F_2$ such that, on occurrence of the change ΔT in temperature of the sensing ring, a corresponding decrease in the electrostatic force $F_1$ across the distance $d_1$ at least partially cancels a corresponding increase in the electrostatic force $F_2$ across the distance $d_2$.

2. A motion sensor as recited in claim 1, wherein at least one electrode structure of the at least one pair of diametrically-opposed electrode structures is a drive electrode structure, and wherein the circuitry causes the first and second electrodes of the drive electrode structure to induce vibration in the sensing ring near a resonant frequency of the sensing ring.

3. A motion sensor as recited in claim 1, wherein at least one electrode structure of the at least one pair of diametrically-opposed electrode structures is a sensing electrode structure, and wherein the circuitry detects the electrostatic forces $F_1$ and $F_2$ through the first and second electrodes of the sensing electrode structure.

4. A motion sensor as recited in claim 1, wherein at least one electrode structure of the at least one pair of diametrically-opposed electrode structures is a balance electrode structure, and wherein the circuitry causes the first and second electrodes of the balance electrode structure to induce stiffness in the sensing ring.

5. A motion sensor as recited in claim 1, further comprising at least a second pair of diametrically-opposed electrode structures around the sensing ring such that there are at least two pairs of electrode structures around the sensing ring, the at least two pairs of electrode structures being located equi-angularly around the sensing ring.

6. A motion sensor as recited in claim 5, wherein:
    at least one electrode structure of the at least two pairs of electrode structures is a drive electrode structure, and wherein the circuitry causes the first and second electrodes of the drive electrode structure to induce vibration in the sensing ring near a resonant frequency of the sensing ring; and
    at least one electrode structure of the at least two pairs of electrode structures is a sensing electrode structure, and wherein the circuitry detects the electrostatic forces $F_1$ and $F_2$ through the first and second electrodes of the sensing electrode structure.

7. A motion sensor as recited in claim 6, wherein at least one of the drive and sensing electrode structures further comprises a balance electrode structure, and wherein the circuitry causes the balance electrode structure to induce stiffness in the sensing ring.

8. A motion sensor as recited in claim 1, further comprising at least a second, third and fourth pair of diametrically-opposed electrode structures around the sensing ring such that there are at least four pairs of electrode structures around the sensing ring, the at least four pairs of electrode structures being located equi-angularly around the sensing ring.

9. A motion sensor as recited in claim 8, wherein:
    at least two electrode structures of the at least four pairs of electrode structures are drive electrode structures, and wherein the circuitry causes the first and second electrodes of each drive electrode structure to induce vibration in the sensing ring near a resonant frequency of the sensing ring; and
    at least two electrode structures of the at least four pairs of electrode structures are sensing electrode structures, and wherein the circuitry detects the electrostatic forces $F_1$ and $F_2$ through the first and second electrodes of the sensing electrode structure.

10. A motion sensor as recited in claim 9, wherein at least one of the drive and sensing electrode structures further comprises a balance electrode structure, and wherein the circuitry causes the balance electrode structure to induce stiffness in the sensing ring.

11. A motion sensor as recited in claim 1, wherein the distance $d_1$ is equal to the distance $d_2$.

12. An angular rate sensor comprising:

a substrate;

an electrically-conductive sensing ring supported above the substrate so as to have an axis of rotation normal to the substrate;

at least two pairs of diametrically-opposed electrode structures located equi-angularly around the sensing ring, each electrode structure comprising:

a base member extending radially from the sensing ring, the base member having opposing sides;

a first pair of members extending perpendicularly from a first side of the base member;

a second pair of members extending perpendicularly from a second side of the base member opposite the first pair of members;

a first electrode between the first pair of members such that the first electrode is a distance "$d_{1a}$" from a first member of the first pair of members and a distance "$d_{1b}$" from a second member of the first pair of members, the distance $d_{1a}$ increasing and the distance $d_{1b}$ decreasing with a change "$\Delta T$" in temperature of the sensing ring due to thermal expansion thereof; and a second electrode between the second pair of members such that the second electrode is a distance "$d_{2a}$" from a first member of the second pair of members and a distance "$d_{2b}$" from a second member of the second pair of members, the distance $d_{2a}$ increasing and the distance $d_{2b}$ decreasing with the change $\Delta T$ in temperature of the sensing ring due to thermal expansion thereof; and circuitry associated with at least one electrode structure of the at least two pairs of diametrically-opposed electrode structures for detecting electrostatic forces "$F_{1a}$" and "$F_{1b}$" between the first electrode and the first and second members, respectively, of the first pair of members, and for detecting electrostatic forces "$F_{2a}$" and "$F_{2b}$" between the second electrode and the first and second members, respectively, of the second pair of members, the circuitry further summing the electrostatic forces $F_{1a}$, $F_{1b}$, $F_{2a}$ and $F_{2b}$ such that, on occurrence of the change $\Delta T$ in temperature of the sensing ring, a corresponding decrease in the electrostatic forces $F_{1a}$ and $F_{2a}$ across the distances $d_{1a}$ and $d_{2a}$, respectively, at least partially cancels a corresponding increase in the electrostatic forces $F_{1b}$ and $F_{2b}$ across the distances $d_{1b}$ and $d_{2b}$, respectively.

13. An angular rate sensor as recited in claim 12, wherein at least two electrode structures of the at least two pairs of diametrically-opposed electrode structures are drive electrode structures, and wherein the circuitry causes the first and second electrodes of each drive electrode structure to induce vibration in the sensing ring near a resonant frequency of the sensing ring.

14. An angular rate sensor as recited in claim 12, wherein at least two electrode structures of the at least two pairs of diametrically-opposed electrode structures are sensing electrode structures, and wherein the circuitry detects the electrostatic forces $F_{1a}$, $F_{1b}$, $F_{2a}$ and $F_{2b}$ through the first and second electrodes of the sensing electrode structure.

15. An angular rate sensor as recited in claim 12, wherein at least one electrode structure of the at least two pairs of diametrically-opposed electrode structures comprises a balance electrode structure, the balance electrode structure comprising:

a third pair of members extending perpendicularly from opposite sides of the base member;

a third electrode adjacent a first member of the third pair of members such that the third electrode is a distance "$d_{3a}$" therefrom, the distance $d_{3a}$ increasing with the change "$\Delta T$" in temperature of the sensing ring; and a fourth electrode adjacent a second member of the third pair of members such that the third electrode is a distance "$d_{3b}$" therefrom, the distance $d_{3b}$ decreasing with the change $\Delta T$ in temperature of the sensing ring;

wherein the circuitry causes the third and fourth electrodes of the balance electrode structure to induce stiffness in the sensing ring.

16. An angular rate sensor as recited in claim 15, wherein each electrode structure of the at least two pairs of diametrically-opposed electrode structures further comprises a balance electrode structure.

17. An angular rate sensor as recited in claim 15, further comprising an annular-shaped conductor on the substrate beneath the sensing ring, wherein the balance electrode structure is electrically interconnected with the conductor.

18. An angular rate sensor as recited in claim 12, further comprising:

an annular-shaped conductor on the substrate beneath the sensing ring; and balance electrodes equi-angularly spaced around and adjacent the sensing ring, each balance electrode structure being electrically interconnected with the conductor;

wherein the circuitry causes the balance electrodes to induce stiffness in the sensing ring.

19. An angular rate sensor as recited in claim 12, wherein the distance $d_{1a}$ is equal to the distance $d_{2b}$, the distance $d_{1b}$ is equal to the distance $d_{2a}$, and the distances $d_{1a}$ and $d_{2b}$ are less than the distances $d_{1b}$ and $d_{2a}$, whereby, on occurrence of the change $\Delta T$ in temperature of the sensing ring, the corresponding decrease in the electrostatic force $F_{1a}$ across the distance $d_{1a}$ approximately cancels the corresponding increase in the electrostatic force $F_{2b}$ across the distance $d_{2b}$, and the corresponding increase in the electrostatic force $F_{1b}$ across the distance $d_{1b}$ approximately cancels the corresponding decrease in the electrostatic force $F_{2a}$ across the distance $d_{2a}$.

20. An angular rate sensor comprising:

a substrate;

a post supported by the substrate;

spring members extending radially from the post;

an electrically-conductive sensing ring supported above the substrate by the spring members so as to have an axis of rotation through the post;

at least one annular-shaped conductor on the substrate beneath the sensing ring;

at least four pairs of diametrically-opposed electrode structures located equi-angularly around the sensing ring, each electrode structure comprising:

a base member extending radially from the sensing ring, the base member having opposing sides;

a first pair of teeth extending perpendicularly from a first side of the base member;

a second pair of teeth extending perpendicularly from a second side of the base member opposite the first pair of teeth;

a third pair of teeth extending perpendicularly from the first side of the base member;

a fourth pair of teeth extending perpendicularly from the second side of the base member opposite the third pair of teeth;

a first pair of electrodes interdigitized with the first pair of teeth, a distance between a first electrode of the first pair of electrodes and a first tooth of the first pair of teeth increasing and a distance between the first electrode and a second tooth of the first pair of teeth decreasing with a change "$\Delta T$" in temperature of the sensing ring due to thermal expansion thereof;

a second pair of electrodes interdigitized with the second pair of teeth, a distance between a first electrode of the second pair of electrodes and a first tooth of the second pair of teeth increasing and a distance between the first electrode of the second pair of electrodes and a second tooth of the second pair of teeth decreasing with the change "$\Delta T$" in temperature of the sensing ring due to thermal expansion thereof;

a third pair of electrodes interdigitized with the third pair of teeth, a distance between a first electrode of the third pair of electrodes and a first tooth of the third pair of teeth increasing and a distance between the first electrode of the third pair of electrodes and a second tooth of the third pair of teeth decreasing with the change "$\Delta T$" in temperature of the sensing ring due to thermal expansion thereof; and a fourth pair of electrodes interdigitized with the fourth pair of teeth, a distance between a first electrode of the fourth pair of electrodes and a first tooth of the fourth pair of teeth increasing and a distance between the first electrode of the fourth pair of electrodes and a second tooth of the fourth pair of teeth decreasing with the change "$\Delta T$" in temperature of the sensing ring due to thermal expansion thereof;

circuitry for detecting electrostatic forces between the first pair of electrodes and the first pair of teeth and between the second pair of electrodes and the second pair of teeth of at least two electrode structures of the at least four pairs of diametrically-opposed electrode structures;

circuitry for applying a voltage to the first and second pair of electrodes of at least one electrode structure of the at least four pairs of diametrically-opposed electrode structures so as to induce vibration in the sensing ring near a resonant frequency of the sensing ring;

electrical interconnects between the annular-shaped conductor and the third and fourth pair of electrodes of each electrode structure of the at least four pairs of diametrically-opposed electrode structures; and circuitry for applying a voltage to the third and fourth pair of electrodes of each electrode structure of the at least four pairs of diametrically-opposed electrode structures so as to induce stiffness in the sensing ring.

* * * * *